United States Patent
Buck et al.

(10) Patent No.: US 11,800,880 B2
(45) Date of Patent: Oct. 31, 2023

(54) SYSTEM AND METHOD FOR SCORING AND/OR CUTTING CHEWING GUM

(71) Applicant: INTERCONTINENTAL GREAT BRANDS LLC, East Hanover, NJ (US)

(72) Inventors: Ann E. Buck, Whippany, NJ (US); Bharat Jani, Whippany, NJ (US); Miles J. van Niekerk, Whippany, NJ (US); Bhairavi Modak, Whippany, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 347 days.

(21) Appl. No.: 15/102,049

(22) PCT Filed: Dec. 5, 2014

(86) PCT No.: PCT/US2014/068766
§ 371 (c)(1),
(2) Date: Jun. 6, 2016

(87) PCT Pub. No.: WO2015/085159
PCT Pub. Date: Jun. 11, 2015

(65) Prior Publication Data
US 2016/0309737 A1    Oct. 27, 2016

Related U.S. Application Data

(60) Provisional application No. 61/913,061, filed on Dec. 6, 2013.

(51) Int. Cl.
*A23G 4/04* (2006.01)
*B26D 3/08* (2006.01)
(Continued)

(52) U.S. Cl.
CPC ............... *A23G 4/04* (2013.01); *B26D 3/085* (2013.01); *B26D 7/088* (2013.01); *B26D 7/1854* (2013.01); *B26D 2210/02* (2013.01)

(58) Field of Classification Search
CPC . B26D 3/08; B26D 3/085; B26D 7/08; B26D 7/1845; B26D 7/1854
(Continued)

(56) References Cited

U.S. PATENT DOCUMENTS

| 1,072,316 A | * | 9/1913 | Cundall | ............... | B26D 7/1854 |
| | | | | | 83/345 |
| 1,771,506 A | | 7/1930 | Mustin | | |

(Continued)

FOREIGN PATENT DOCUMENTS

| CA | 2829351 A1 | 9/2012 |
| CN | 201544533 U | 8/2010 |

(Continued)

OTHER PUBLICATIONS

International Search Report; International Application No. PCT/US2014/068766; International Filing Date: Dec. 5, 2014; dated Mar. 6, 2015; 4 Pages.

(Continued)

*Primary Examiner* — Sean M Michalski
*Assistant Examiner* — Richard D Crosby, Jr.
(74) *Attorney, Agent, or Firm* — CANTOR COLBURN LLP (57) ABSTRACT

Disclosed is a method for cutting chewing gum, the method including providing a chewing gum sheet to at least one cutting device; applying oil to said at least one cutting device; and cutting said chewing gum sheet via said at least one cutting device. Further disclosed is a method for cutting chewing gum, the method including providing a chewing gum sheet to at least one cutting device; cutting said
(Continued)

chewing gum sheet via said at least one cutting device; and separating chewing gum from said at least one cutting device via a directing of compressed air onto said at least one cutting device.

15 Claims, 4 Drawing Sheets

(51) Int. Cl.
*B26D 7/08* (2006.01)
*B26D 7/18* (2006.01)

(58) Field of Classification Search
USPC .................................. 83/98, 99, 168, 169
See application file for complete search history.

(56) References Cited

U.S. PATENT DOCUMENTS

| | | | |
|---|---|---|---|
| 1,771,981 A | 7/1930 | Mustin | |
| 1,944,577 A | 1/1934 | Rose | |
| 1,945,755 A * | 2/1934 | Seruggs, Jr. | A21C 11/10 83/426 |
| 2,076,112 A | 4/1937 | Barker | |
| 2,187,801 A * | 1/1940 | Brustowsky | B26D 7/088 83/121 |
| 2,319,140 A * | 5/1943 | Kottmann | B26D 7/088 184/81 |
| 2,913,342 A | 11/1959 | Cameron et al. | |
| 2,970,915 A | 2/1961 | Ferrari | |
| 3,052,560 A | 4/1962 | Delaney | |
| 3,174,428 A * | 3/1965 | Huck | B26D 7/1854 101/227 |
| 3,176,554 A * | 4/1965 | Dietrich | A21C 11/12 83/575 |
| 3,188,983 A * | 6/1965 | Tomberg | A23G 1/202 425/143 |
| 3,200,685 A * | 8/1965 | Heilbrunn | B26D 7/18 83/156 |
| 3,285,750 A | 11/1966 | Ishida | |
| 3,291,614 A | 12/1966 | Tumerman et al. | |
| 3,293,043 A | 12/1966 | Matz et al. | |
| 3,338,154 A * | 8/1967 | Camacho | A21C 15/002 222/161 |
| 3,455,755 A * | 7/1969 | Phillips | A23G 4/04 156/204 |
| 3,570,417 A * | 3/1971 | Herrmann | A23G 3/0236 426/104 |
| 3,698,271 A * | 10/1972 | Kesten | B26D 7/1863 83/99 |
| 3,734,748 A | 5/1973 | Ueno et al. | |
| 3,872,752 A * | 3/1975 | Remde | A21C 11/10 83/100 |
| 3,952,647 A * | 4/1976 | Holbrook | A23N 15/00 100/173 |
| 3,974,293 A | 8/1976 | Witzel | |
| 3,984,574 A | 10/1976 | Comolo | |
| 4,208,432 A | 6/1980 | Noborio et al. | |
| 4,288,280 A * | 9/1981 | Morin | A45C 5/02 156/538 |
| 4,318,323 A * | 3/1982 | Voorhees | B26D 7/088 D15/138 |
| 4,357,862 A * | 11/1982 | Anstett | A21B 5/08 99/405 |
| 4,475,426 A | 10/1984 | Dammig et al. | |
| 4,534,248 A * | 8/1985 | Andersson | B26D 7/1818 83/99 |
| 4,555,407 A | 11/1985 | Kramer et al. | |
| 4,574,817 A * | 3/1986 | Suzuki | A24C 5/473 131/94 |
| 4,882,175 A * | 11/1989 | Ream | A21C 3/06 426/5 |
| 4,993,211 A | 2/1991 | Piano | |
| 5,031,497 A * | 7/1991 | Moshier | B26D 1/54 83/807 |
| 5,235,885 A * | 8/1993 | Camarena | B23Q 11/02 384/42 |
| 5,405,623 A | 4/1995 | Barkalow et al. | |
| 5,409,715 A | 4/1995 | Meyers | |
| 5,435,714 A | 7/1995 | Van Lengerich et al. | |
| 5,562,936 A * | 10/1996 | Song | A23G 4/00 426/3 |
| 5,756,133 A * | 5/1998 | Duggan | A23G 4/02 198/435 |
| 5,789,002 A * | 8/1998 | Duggan | A23G 4/20 426/3 |
| 5,792,495 A * | 8/1998 | Degady | A23G 4/02 425/208 |
| 5,944,266 A | 8/1999 | Degady et al. | |
| 5,955,116 A * | 9/1999 | Kehoe | A23G 4/02 425/131.1 |
| 5,971,739 A * | 10/1999 | Hoffman | A23G 4/04 425/327 |
| 5,972,392 A * | 10/1999 | Kopecky | A23G 4/18 426/3 |
| 6,153,233 A * | 11/2000 | Gordon | A23P 20/12 426/103 |
| 6,254,373 B1 | 7/2001 | Hoffman et al. | |
| 6,284,291 B1 * | 9/2001 | Siecke | A23G 4/02 425/233 |
| 6,431,041 B1 * | 8/2002 | Rompa | B26D 1/553 83/768 |
| 6,472,001 B1 * | 10/2002 | Bunkers | A23G 3/2061 425/236 |
| 6,623,266 B2 * | 9/2003 | Jani | A23G 3/125 425/126.2 |
| 6,626,660 B1 * | 9/2003 | Olson | B29C 48/30 425/190 |
| 6,759,066 B2 * | 7/2004 | Savage | A23G 4/06 426/3 |
| 6,838,098 B2 * | 1/2005 | Bunkers | A23G 3/0247 425/236 |
| 7,112,345 B1 * | 9/2006 | McHale | A23G 4/043 426/5 |
| 7,658,602 B2 * | 2/2010 | Fornaguera | A23G 1/54 425/235 |
| 7,767,237 B2 | 8/2010 | Bunkers et al. | |
| 8,226,401 B2 * | 7/2012 | Olejarski | A23G 4/02 425/143 |
| 2002/0192330 A1 * | 12/2002 | Bunkers | A23G 3/0247 426/5 |
| 2003/0035872 A1 | 2/2003 | Giraldo et al. | |
| 2004/0194605 A1 * | 10/2004 | Weber | B26D 7/30 83/663 |
| 2004/0224054 A1 * | 11/2004 | Mikkelsen | A23G 3/004 426/5 |
| 2005/0016447 A1 * | 1/2005 | Dove | A23P 20/12 118/19 |
| 2006/0040041 A1 * | 2/2006 | Shulski | A23G 3/0025 426/660 |
| 2006/0078509 A1 * | 4/2006 | Gebreselassie | A23G 4/02 424/48 |
| 2006/0165833 A1 * | 7/2006 | Muschalik | B21C 23/12 425/296 |
| 2006/0257523 A1 * | 11/2006 | Mikkelsen | A23G 3/004 426/3 |
| 2007/0104828 A1 | 5/2007 | Fornaguera | |
| 2007/0128234 A1 * | 6/2007 | Subramaniam | A23G 4/06 424/401 |
| 2007/0286926 A1 | 12/2007 | Bunkers et al. | |
| 2008/0057154 A1 * | 3/2008 | Acar | A23G 4/02 426/5 |
| 2008/0245201 A1 * | 10/2008 | Darzi | B26D 7/1854 83/466 |
| 2009/0038455 A1 * | 2/2009 | Strong | B65G 21/209 83/155.1 |
| 2009/0044671 A1 * | 2/2009 | Greenleaf | B21D 28/34 83/133 |

(56) References Cited

U.S. PATENT DOCUMENTS

| | | | |
|---|---|---|---|
| 2009/0162476 A1* | 6/2009 | Duggan | A23G 4/02 426/3 |
| 2010/0136185 A1* | 6/2010 | Miladinov | A23G 3/0068 426/103 |
| 2010/0313719 A1 | 12/2010 | Jani | |
| 2011/0052756 A1* | 3/2011 | Cervenka | A23G 4/02 426/5 |
| 2011/0129564 A1 | 6/2011 | Christensen et al. | |
| 2011/0159142 A1 | 6/2011 | Marin et al. | |
| 2011/0159143 A1 | 6/2011 | Elejalde et al. | |
| 2011/0262588 A1 | 10/2011 | Elejalde et al. | |
| 2011/0262620 A1 | 10/2011 | Elejalde et al. | |
| 2012/0164267 A1 | 6/2012 | Boit et al. | |
| 2012/0207875 A1* | 8/2012 | Aldridge | A23G 3/0046 426/5 |
| 2012/0207888 A1 | 8/2012 | King | |
| 2013/0071516 A1* | 3/2013 | Elejalde | A23G 3/54 426/5 |
| 2013/0104709 A1* | 5/2013 | Rother | B65G 45/18 83/100 |
| 2013/0202734 A1 | 8/2013 | Jani et al. | |
| 2014/0144421 A1* | 5/2014 | Chua | B26D 1/553 125/21 |
| 2014/0287091 A1* | 9/2014 | Jani | A23G 3/0019 426/5 |
| 2014/0302195 A1* | 10/2014 | Jani | A23G 3/0019 426/5 |
| 2014/0314906 A1* | 10/2014 | Verdu | A23G 3/0014 426/5 |
| 2015/0044010 A1* | 2/2015 | Biggel | A01J 27/00 414/793 |
| 2015/0360381 A1* | 12/2015 | Tomlinson | B26D 5/086 83/337 |
| 2016/0007628 A1* | 1/2016 | Capar | B26D 7/20 83/13 |
| 2016/0309737 A1* | 10/2016 | Wymore | A23G 4/04 |

FOREIGN PATENT DOCUMENTS

| | | | |
|---|---|---|---|
| GB | 359458 A | 10/1931 | |
| GB | 674294 A | 6/1952 | |
| JP | 6062948 A | 4/1985 | |
| JP | 2222652 A | 9/1990 | |
| JP | 965833 A | 3/1997 | |
| JP | 2010538669 A | 12/2010 | |
| JP | 2011167192 A | 9/2011 | |
| JP | 201229639 A | 2/2012 | |
| JP | 3181121 U | 1/2013 | |
| WO | 2011090520 A1 | 7/2011 | |
| WO | 2012014440 A1 | 2/2012 | |
| WO | 2013013041 A2 | 1/2013 | |
| WO | 2013013046 A2 | 1/2013 | |

OTHER PUBLICATIONS

Written Opinion of the International Searching Authority; International Application No. PCT/US2014/068766; International Filing Date: Dec. 5, 2014; dated Mar. 6, 2015; 4 Pages.

Chinese Office Action with english translation; CN Application No. 201480065441.8; dated Apr. 16, 2019; pp. 1-18.

Communication Pursuant to Article 94(3) EPC; European Application No. 14821951.2; dated Jul. 18, 2018; 6 Pages.

EP Communication pursuant to Article 94(3) EPC; Application No. 14 821 951.2-1105; dated Apr. 8, 2019; pp. 1-7.

Notice of Reasons for Refusal; Japanese Application No. 2016-528828; Ddated Oct. 19, 2017; 16 Pages.

Notice of Reasons for Refusal; Japanese Application No. 2016-528828; dated Sep. 27, 2018; 5 Pages (English translation not available).

Notice of Reasons for Rejection—Official Action; Japanese Application No. 2016-528828; dated Mar. 10, 2017; 6 Pages.

Notice of Reasons for Refusal: International Application No. 2016-528828; International Filing Date: May 9, 2016; dated Jul. 28, 2020; 5 pages with translation.

Communication Pursuant to Article 94(3) EPC; International Application No. 14821951.2-1105; International Filing Date: Mar. 2, 2015; dated Feb. 11, 2021; 5 pages.

Extended European Search Report for European Application No. 22210176.8; dated Apr. 19, 2023 (pp. 1-10).

* cited by examiner

SYSTEM AND METHOD FOR SCORING AND/OR CUTTING CHEWING GUM

CROSS REFERENCE TO RELATED APPLICATIONS

This application is a National Stage application of PCT/US2014/068766, filed Dec. 5, 2014, which claims the benefit of U.S. Provisional Application No. 61/913,061, filed Dec. 6, 2013, both of which are incorporated by reference in their entirety herein.

FIELD

The disclosure relates generally to a system and method for scoring and/or cutting chewing gum, and more particularly to a system and method for scoring and/or cutting chewing gum without the use of powder.

BACKGROUND

Conventional scoring and cutting systems and methods used for scoring and cutting chewing gum often require the application of powder to the chewing gum in order to sufficiently release the chewing gum from the cutting devices. Such application of powder to the chewing gum may cause a buildup of excess powder on process equipment, leading to greater maintenance requirements and lower operating efficiencies.

Accordingly, a system and method for efficiently and effectively scoring and/or cutting chewing gum without the application of powder would be desirable.

SUMMARY

Disclosed is a method for cutting chewing gum, the method including providing a chewing gum sheet to at least one cutting device; applying oil to said at least one cutting device; and cutting said chewing gum sheet via said at least one cutting device.

Further disclosed is a method for cutting chewing gum, the method including providing a chewing gum sheet to at least one cutting device; cutting said chewing gum sheet via said at least one cutting device; and separating chewing gum from said at least one cutting device via a directing of compressed air onto said at least one cutting device.

Further disclosed is a system for cutting chewing gum, the system including a conveyor configured to provide a chewing gum sheet to at least one cutting device; said at least one cutting device configured to cut said chewing gum sheet; and an oiling system configured to apply oil to said at least one cutting device.

Further disclosed is a system for cutting chewing gum, the system including a conveyor configured to provide a chewing gum sheet to at least one cutting device; said at least one cutting device configured to cut said chewing gum sheet; and a compressed air delivery system configured to direct a compressed air onto said at least one cutting device.

BRIEF DESCRIPTION OF THE FIGURES

The accompanying drawings incorporated in and forming a part of the specification embodies several aspects of the present invention and, together with the description, serve to explain the principles of the invention. In the drawings.

DETAILED DESCRIPTION

The following disclosure will detail particular embodiments according to the present invention, which provides systems and methods for scoring and/or cutting chewing gum, particularly systems and methods for scoring and/or cutting chewing gum without the use of powder. Reference is now made to the drawings, wherein like reference numerals are used to refer to like elements throughout the disclosure.

Figure 1:
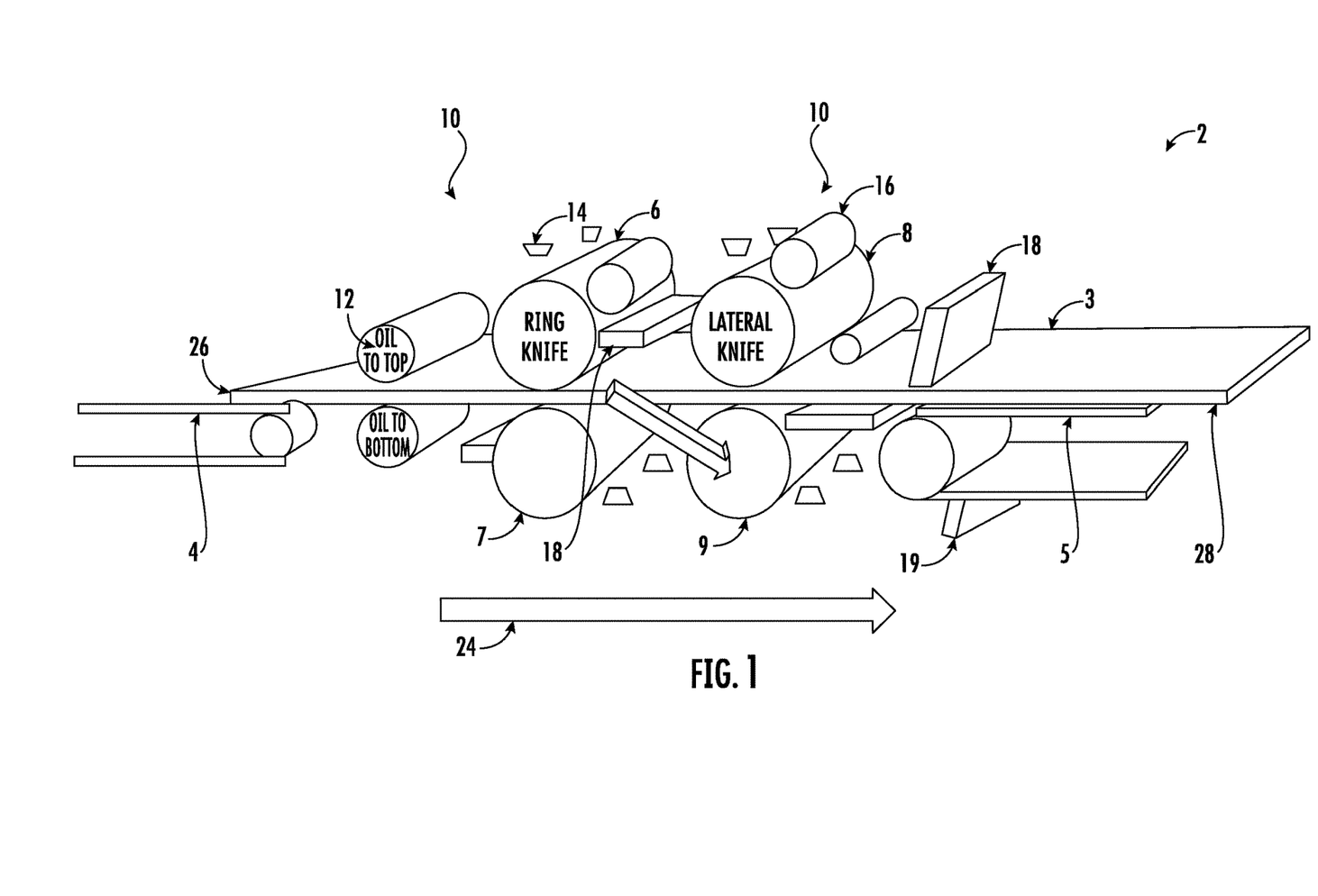
FIG. 1 is a perspective view of a cutting system with the housing removed in accordance with an exemplary embodiment.

Referring first to FIG. 1, a cutting system 2 for chewing gum 3 is illustrated. The chewing gum 3 to be scored or cut by the cutting system 2 is referred to as "chewing gum" or "gum" and includes, but is not limited to, compositions ranging from and inclusive of compounded elastomer to finished gum, which may include compounded elastomer in addition to some compounding aids, master batch gum base, compounded elastomer in addition to some subsequent gum ingredients, compounded elastomer in addition to some gum base ingredients and some subsequent gum ingredients, gum base, gum base in addition to some subsequent gum ingredients, master batch finished gum, and finished gum. The chewing gum 3 may be formed into and processed as a plurality of sheets of chewing gum 3 or fed as a continuous sheet of chewing gum 3.

Incoming sheet(s) of chewing gum 3 may enter cutting system 2 with a temperature ranging from 25 degrees Celsius to 45 degrees Celsius, while preferably ranging from 30 degrees Celsius to 40 degrees Celsius.

Further, incoming sheet(s) of chewing gum 3 may have varying thicknesses. Sheet(s) of chewing gum 3 used for slab gum may include single layer and multi-layer (2, 3, etc.) compositions. Single layer sheet(s) of chewing gum 3 used for slab gum may range in thickness from 3 millimeters to 4 millimeters. Multi-layer sheet(s) of chewing gum 3, particularly 3 layer sheet(s) may range from 4 millimeters to 5.5 millimeters. Sheet(s) of chewing gum 3 used for pellet gum may range in thickness from 4.5 millimeters to 5.5 millimeters. Pellet gum, as known in the art, may have a generally arcuate or pillow shape after scoring/cutting, with a varying thickness along the length of the pellet gum body.

Figure 1A:
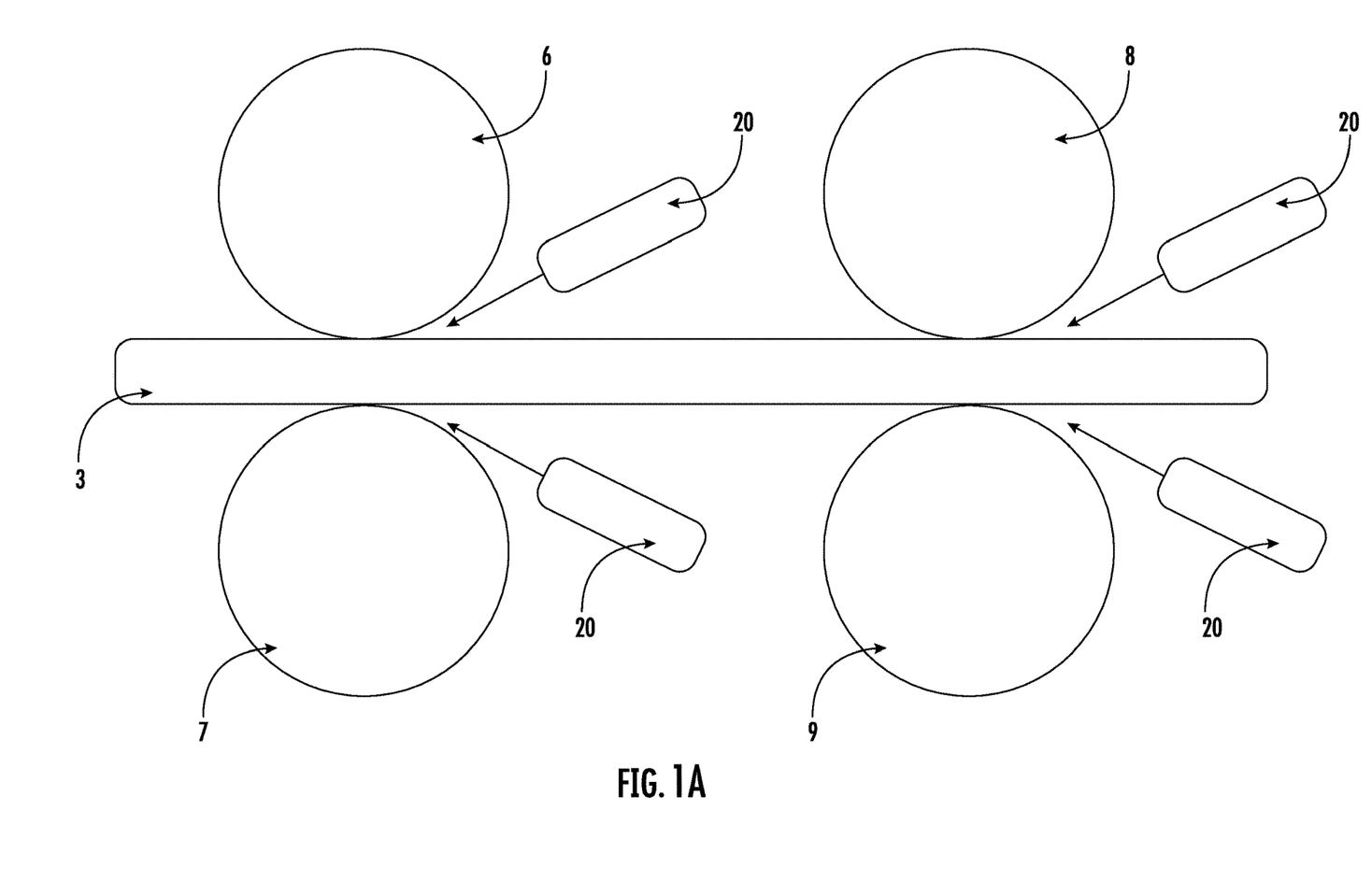
FIG. 1A is a partial side elevation view of a cutting system shown in FIG. 1.

As shown in the exemplary embodiment of FIG. 1, the cutting system 2 includes cutting devices 6, 7, 8, and 9. As will be discussed below, these cutting devices 6, 7, 8, and 9 may be a combination of rollers including a plurality of ring knives and rollers including a plurality of lateral knives, 6, 7, 8, 9 used to score and/or cut chewing gum 3. The cutting system 2 also includes an oiling system 10 and/or a compressed air delivery units 20 (as shown in FIG. 1A) to facilitate the release of chewing gum 3 from the cutting devices. Chewing gum 3 that has been cut and/or scored via the system 2 may later be conveyed from cutting system 2 for packaging or further processing. As will be discussed in conjunction with the system elements hereinbelow, the cutting system 2 is used to score or cut the chewing gum 3 after forming, cooling, or other processing steps without applying powder to chewing gum 3 (directly or via system elements) in order to release the chewing gum 3 from the cutting devices 6, 7, 8, and 9.

As shown schematically in the exemplary embodiment of FIG. 1 and briefly mentioned above, the cutting system 2 includes a conveyor 4, upper and lower parallel cutting device 6, 7, upper and lower perpendicular cutting device 8, 9, the oiling system 10, and the compressed air delivery units 20. The upper and lower parallel cutting devices 6, 7, may be rollers including a plurality of ring knives that score and/or cut the chewing gum 3 parallel to the direction of the chewing gum flow 24. Alternatively, the upper and lower perpendicular cutting devices 8, 9, may be rollers including a plurality of lateral knives that may score and/or cut the chewing gum 3 perpendicular to the direction of the chewing gum flow 24. The oiling system 10 may include oil rollers 12, 16 that apply oil directly to the chewing gum 3 (and therefore indirectly to the cutting devices 6, 7, 8, 9) and oil sprayers 14 to apply oil directly to chewing gum 3 and/or to the cutting devices 6, 7, 8, 9. The compressed air delivery units 20 may operate in conjunction with or independently from oiling system 10 to assist in separating and releasing chewing gum 3 from the cutting devices by applying compressed air to the cutting surfaces of the cutting devices 6, 7, 8, 9.

When the system 2 is in use, the chewing gum 3 is transported to cutting system 2 by conveyor 4 from a cooling device, forming device, or any other process device. In an exemplary embodiment, the conveyor 4 includes belts, rollers, cutting devices, other suitable conveying devices, or any combination thereof. Further, downstream of a conveyor termination point the system 2 may include dead plates or plates (not shown), that allow chewing gum 3 to slide between elements of cutting system 2. In an exemplary embodiment, these plates may include a non-stick surface. Dead plates and other elements may be spaced apart to support the gum 3 within the system (downstream of the conveyor 4), while allowing elements located between these plates, such as the cutting devices 6, 7, 8, 9, oiling system 10, and compressed air delivery units 20, to interact with chewing gum 3 at upper and lower sides thereof. Actuation of chewing gum movement through the cutting system 2 from an entry point 26 of the cutting system 2 to an exit point 28 of the cutting system 2 is achieved via an exit conveyor 5 (which will be discussed in greater detail below) that pulls the chewing gum 3 through the system 2. A "pushing" by the conveyor 4 and the rotation of the cutting devices 6, 7, 8, 9 themselves also assists in this movement. In at least one embodiment of the system 2, chewing gum 3 may be conveyed at a line speed of 3 to 40 meters per minute, particularly, 15 meters per minute or 30 meters per minute.

Various types of oil may be applied within the system 2. For example, the various components of oiling system 10 may impart medium chain trigylceride oil, mineral oil, vegetable oil or any other suitable oil for maintaining separation and preventing adherence between chewing gum 3 and the cutting devices. Suitable oils may have a viscosity between 1 to 100 centipoise at 20 to 40 degrees Celsius, particularly 25 degrees Celsius. The total weight of oil applied to chewing gum 3 may be between 0.1% to 3.0% of the total weight of chewing gum 3.

In at least one embodiment, oil may be applied by oiling system 10 to the chewing gum 3 before chewing gum 3 is conveyed or provided to the cutting devices 6, 7, 8, 9 via rollers 12. Oil may be applied externally to oil rollers 12 (via a sprayer, etc.) or oil may be fed internally and flow outward to surface of oil rollers 12. In at least one embodiment, oil rollers 12 may be disposed above and/or below chewing gum 3. Further, chewing gum 3 may be conveyed by the rolling motion of oil rollers 12. The oil rollers 12 may be made of rubber or any other suitable material. Of course, oil sprayers (such as ultrasonic or high pressure sprayers) may also be used.

Downstream of the rollers 12, the chewing gum 3 is conveyed to the cutting devices 6 and 7. First cutting devices 6, 7 are shown to be disposed both above and below chewing gum 3. However in alternative embodiments, first cutting devices 6, 7 may be disposed only above or only below chewing gum 3 as first upper cutting device 6 or as first lower cutting device 7. In further alternative embodiments, a single first cutting device 6, 7 may be used in conjunction with a cutting surface to support and limit deflection of chewing gum 3 disposed opposite the single first cutting device 6, 7 on the opposite surface (e.g. bottom surface) of chewing gum 3. Cutting surfaces may include cylindrical rollers with smooth knifeless walls or flat plates or anvils.

In at least one embodiment, first cutting devices 6, 7 may be configured to make one or more cuts in a parallel direction relative to chewing gum flow direction 24 at a predetermined spacing. Further, first cutting devices 6, 7 may be rollers including a plurality of ring knives spaced apart at a predetermined spacing in order to make one or more cuts in a parallel direction relative to the chewing gum flow direction 24. The upper roller 6 may rotate in a generally counter clockwise direction while the lower roller 7 may rotate in a generally clockwise direction. These rollers may also oscillate to reduce wear. As will be discussed below, the cutting depth of the first cutting devices 6, 7 may vary.

Downstream of the first cutting devices 6 and 7, the chewing gum 3 is conveyed to second cutting devices 8 and 9. Second cutting devices 8, 9 are shown to be disposed both above and below chewing gum 3. However in alternative embodiments, second cutting devices 8, 9 may be disposed only above or only below chewing gum 3 as second upper cutting device 8 or as second lower cutting device 9. In further alternative embodiments, a single second cutting device 8, 9 may be used in conjunction with a cutting surface to support and limit deflection of chewing gum 3 disposed opposite the single second cutting device 8, 9 on the opposite surface (e.g. bottom surface) of chewing gum 3. Cutting surfaces may include cylindrical rollers with smooth knifeless walls or flat plates or anvils.

In at least one embodiment, second cutting devices 8, 9 may be configured to make cuts in a perpendicular direction relative to chewing gum flow direction 24 at predetermined intervals or spacing. Further, second cutting devices 8, 9 may be rollers including a plurality of lateral knives. The upper roller 8 may rotate in a generally counter clockwise direction while the lower roller 9 may rotate in a generally clockwise direction. Hereagain, these rollers may also oscillate to reduce wear. As will be discussed below, the cutting depth of the second cutting devices 8, 9 may vary.

In order to effectively reduce presence of residual chewing gum 3 and promote separation of chewing gum 3 from the cutting devices oil may be applied to cutting devices 6, 7, 8, 9 by oil sprayers 14. Oil sprayers 14 may be desirable for oil application in that they evenly distribute oil onto the cutting devices and may be disposed above and/or below the cutting devices. Oil sprayers may be ultrasonic sprayers and/or high pressure sprayers. Ultrasonic sprayers utilize a low pressure oil delivery system with a corresponding low velocity spray to control oil application. Similarly, atomized oil delivered by high pressure sprayers is also delivered with a low velocity spray to control oil application.

Oil may be applied directly to the interface or cutting surfaces (e.g. cutting blades) of the cutting devices. Further, rotary type cutting devices, such as rollers including a plurality of ring knives 6, 7, and rollers including a plurality of lateral knives 8, 9 may receive oil directly from oil rollers 16 disposed to be in rotational contact with the cutting or gum interface surfaces of cutting devices 6, 7, 8, 9. Of course, oil applied to the chewing gum 3 itself will ultimately be indirectly applied to the cutting devices 6, 7, 8, 9.

In embodiments with a single first cutting device 6 or 7 or a single second cutting device 8 or 9, it should be appreciated that the cutting depth may be the entire height of the chewing gum 3, or any depth less than the entire height of the chewing gum 3. In embodiments with an upper first cutting device 6 and a lower first cutting device 7 and/or an upper second cutting device 8 and a lower second cutting device 9, the cutting depth or combined cutting depth of cutting devices 6, 7 and cutting devices 8, 9 may be less than an entire height of the gum 3.

In accordance with the above and for the purposes of this disclosure, the term "cutting" as achieved via the above or other cutting devices may be defined as cutting through the entire height of the sheet of chewing gum 3, wherein separate portions of chewing gum 3 that are independently conveyable are created, or as a scoring the chewing gum 3 to a depth less than the entire height of the chewing gum 3, wherein separate portions of chewing gum 3 are not created. Specifically, when the chewing gum 3 is cut or scored through to a depth less than the entire height of the chewing gum 3, the forward motion of the gum web of chewing gum 3 may still convey the remainder of chewing gum 3 as the entire (continuous or non-continuous) sheet of chewing gum 3. Accordingly, chewing gum 3 may move as a single unit and not be considered separate portions, though the unit may easily be separated into portions (along the scores) later.

Further, cutting devices 6, 7, 8, 9 in addition to cutting and/or scoring chewing gum 3 may perform a trimming operation. Trimming as achieved via the above or other cutting devices may be defined as cutting through the entire height of the sheet of chewing gum 3 along the edges of the sheet of chewing gum 3. Portions removed by trimming may fall below conveyor 4 to a separate trim conveyor. The trim conveyor may move in the same direction as conveyor 4 and gum flow 24.

As the chewing gum 3 passes through the cutting devices 6, 7, 8, 9, and in order to further promote separation of chewing gum 3 from cutting devices 6, 7, 8, 9, compressed air may be applied by compressed air delivery units 20. As shown in FIG. 1, compressed air delivery units 20 may be positioned proximate each of the cutting devices 6, 7, 8, 9. Though these units 20 are shown to be used in conjunction with the oiling system 10 in FIG. 1, it should of course be appreciated that these units 20 may operate with or without the oiling system 10 or components thereof. That is, compressed air may be applied to cutting devices 6, 7, 8, 9 without being oiled.

The compressed air may be applied to the cutting devices in a direction that is generally opposite rotation of the cutting devices 6, 7, 8, 9, perhaps in a direction opposite of flow of the gum 3. The compressed air is employed to sufficiently separate or at least assist to separate the chewing gum 3 from the cutting devices 6, 7, 8, 9, with this separation being optionally assisted by including non-stick surfaces on the cutting devices 6, 7, 8, 9 (via a non-stick coating applied to the cutting devices 6, 7, 8, 9). Separation of the chewing gum may include removing residual chewing gum 3 from the cutting device 6, 7, 8, 9, reducing or eliminating the adherence between the chewing gum 3 sheet(s) and the cutting devices 6, 7, 8, 9, and/or reducing or eliminating the adherence between trimmed portions of chewing gum 3 and the trim cutting devices (which are often ring knives at the end of cutting devices 6,7 that cut completely through the gum sheet 3 along trim end(s) thereof) and directing the trimmed portions from the remainder of the sheet 3 onto a trim conveyor.

In addition, excess oil that may have accumulated on the cutting devices and chewing gum 3, which may be undesirably transferred to other portions of cutting system 2 and to other processes downstream of cutting system 2, may be addressed via scrapers 18. Scrapers 18 may be disposed to remove excess oil and residual chewing gum 3 from the cutting devices 6, 7, 8, 9. For rollers including a plurality of ring knives 8,9 these scrapers 18 may be in interference contact with the ring knives 8,9 to be scraped, wherein a blade portion of scraper 18 is disposed at an obtuse angle relative to the motion of the ring knives 8,9 to be scraped in order to remove any residual chewing gum 3 or excess oil.

After all cutting and separation operations, the chewing gum 3 may be conveyed from conveyor 4 to exit conveyor 5, which transports the chewing gum 3 from the system 2. Exit conveyor 5 may transport the chewing gum 3 to downstream processes such as cooling, packaging or any other suitable process. Further, exit conveyor 5 may receive residual chewing gum 3 and excess oil from cutting and separation processes. A scraper 19 may be disposed on the return side of the exit conveyor 5 to scrape chewing gum 3 and excess oil.

Figure 2:
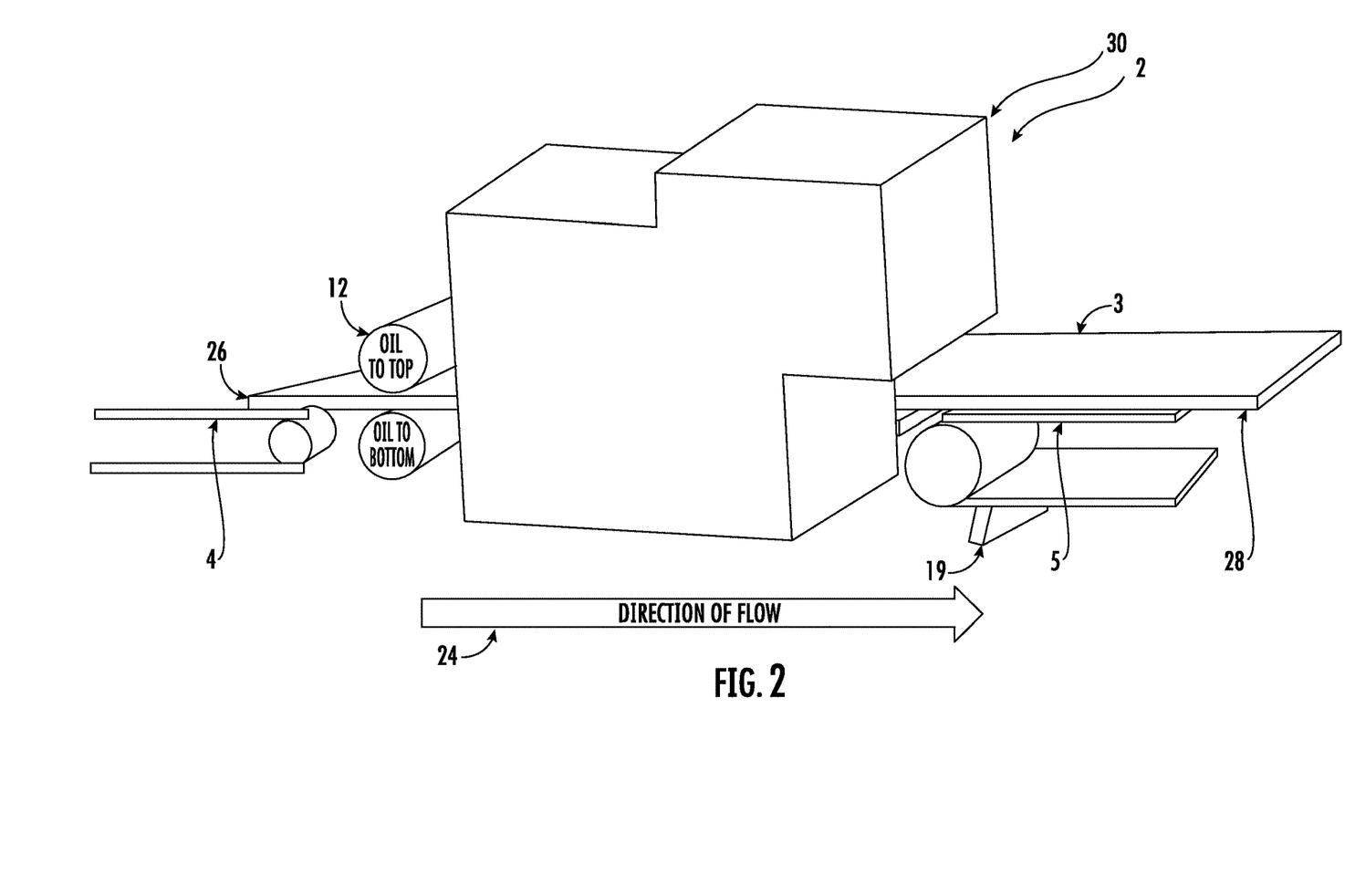
FIG. 2 is a perspective view of a cutting system in accordance with an exemplary embodiment.

Referring now to FIG. 2, it should be noted that the chewing gum 3 may be sensitive to environmental factors such as temperature and humidity. In order to control such environmental factors, the cutting devices may be disposed in a housing 30 as shown in FIG. 2. Within housing 30, dehumidified and cooled air may be forced and circulated. The relative humidity within the housing may be between 10% to 40% to eliminate condensation on cutting devices 6, 7, 8, 9, and rollers 16. Further, the temperature within the housing 30 may be maintained between 18 degrees Celsius and 25 degrees Celsius.

Figure 3:
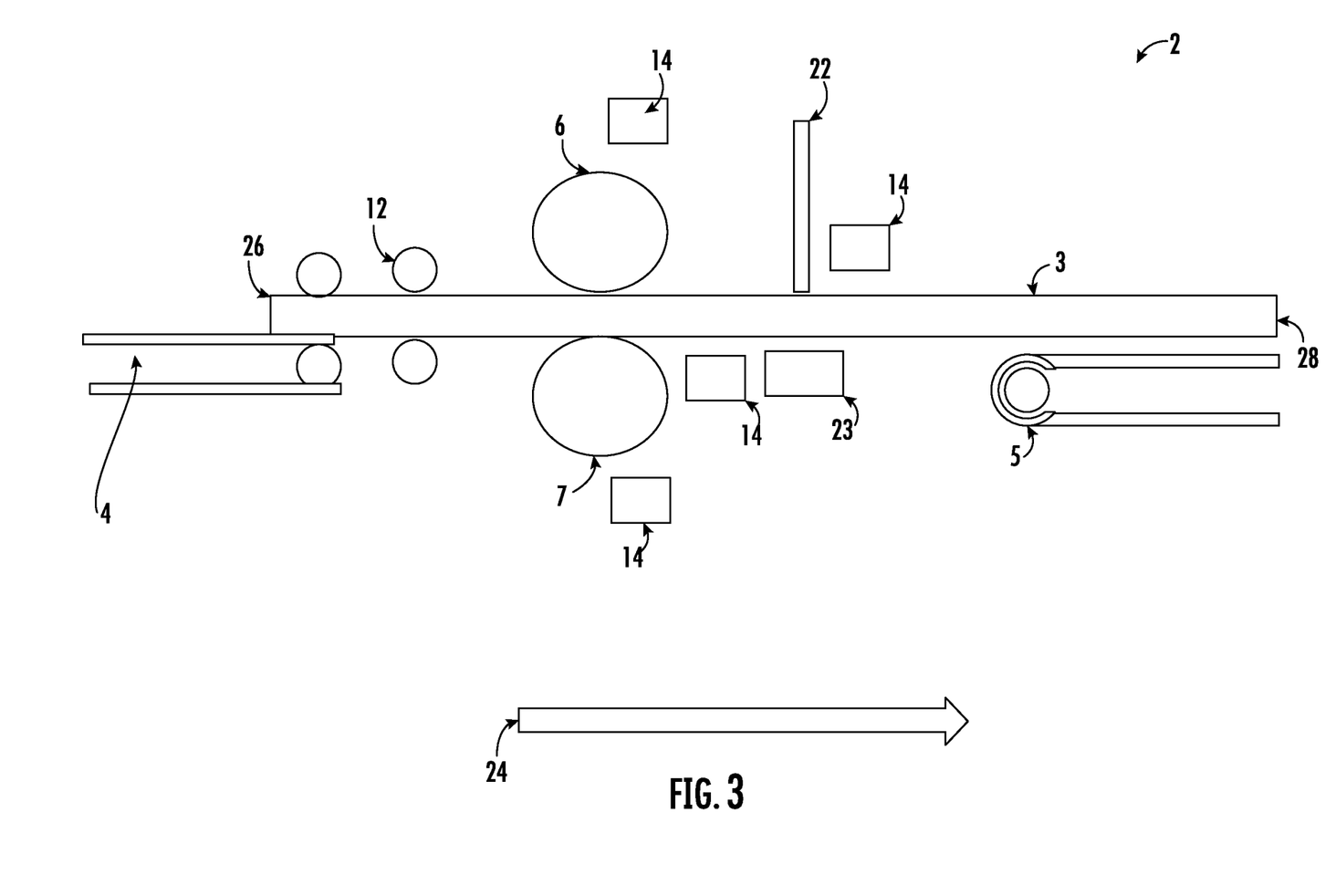
FIG. 3 is a side elevation view of a cutting system in accordance with an alternative embodiment.

Referring now to FIG. 3, an alternative embodiment of the system 2 is illustrated, wherein the second cutting devices 8, 9 are replaced with a reciprocating cutting system 21. In this embodiment, the chewing gum 3 is cut into pellet shaped gum.

The reciprocating cutting system 21 shown in FIG. 3 includes a reciprocating knife 22 and cutting surface 23. This system 21 is configured to cut the chewing gum 3 in a direction perpendicular to flow 24. Reciprocating knife 22 reciprocates in a vertical cutting motion, and may additionally move horizontally to compensate for speed of gum flow 24 while cutting chewing gum 3. Cutting surface 23 is a relatively fixed surface configured to facilitate the cutting operation of reciprocating knife 22 by limiting the downward travel of gum 3 as reciprocating knife 22 moves downward. Similarly and accordingly, the cutting depth of reciprocating knife 22 may be the entire height of chewing gum 3 to create separate portions in a perpendicular direction relative to gum flow direction 24 or may alternatively cut to a depth less than the entire height of chewing gum 3 to allow for a score that allows chewing gum 3 to be conveyed as a single unit.

Similarly to that which was discussed with regards to cutting devices 6, 7, 8, 9, in order to effectively reduce presence of residual chewing gum 3 and promote separation of chewing gum 3 from the reciprocating knife 22 and cutting surface 23 oil may be applied to one or both of the reciprocating knife 22 and cutting surface 23 by oil sprayers 14. Hereagain, oil sprayers may be ultrasonic sprayers and/or high pressure sprayers. Oil sprayers 14 may be desirable for oil application in that they evenly distribute oil onto the reciprocating knife 22 and cutting surface 23. Of course, oil applied to the chewing gum 3 itself at roller 12 will ultimately be indirectly applied to the reciprocating knife 22 and cutting surface 23.

Via the above discussed system embodiments, non-powdered chewing gum compositions may be cut without the adhering to cutting elements. This desirably reduces the need for preventative maintenance associated with powder use, increases equipment uptime, increases air quality by removing airborne particulates, removes the need for dust collection, and eliminates the need to change-over between fruit and mint dusting systems.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for cutting chewing gum, the method comprising:
   forming a chewing gum sheet;
   providing said chewing gum sheet to at least one cutting device having at least one cutting surface, without applying powder to the chewing gum sheet;
   applying oil to at least one of said at least one cutting device and said chewing gum sheet;
   transferring oil from said at least one cutting surface to said chewing gum sheet;
   removing excess oil from said chewing gum sheet via an oil scraper; and
   cutting said chewing gum sheet to form a plurality of pellets via said at least one cutting device.

2. The method of claim 1, wherein said at least one cutting device is at least one upper cutting device disposed at a relatively upper surface of said gum sheet and at least one lower cutting device disposed at a relatively second surface of said gum sheet, said oil being applied to both of said upper cutting device and said lower cutting device.

3. The method of claim 1, wherein said at least one cutting device is at least one roller including a plurality of ring knives configured for said cutting of said gum sheet in a direction parallel to a direction of gum flow towards said at least one cutting device or at least one roller including a plurality of lateral knives configured for said cutting of said gum sheet in a direction perpendicular to a direction of gum flow towards said at least one cutting device.

4. The method of claim 1, wherein said at least one cutting device is an at least one reciprocating cutting device including a reciprocating knife and a cutting surface, wherein said reciprocating device is configured for said cutting of said gum sheet in a direction perpendicular to a direction of gum flow towards said at least one cutting device.

5. The method of claim 1, wherein said chewing gum sheet is a continuous chewing gum sheet.

6. The method of claim 1, wherein said applying of said oil to said at least one cutting device is an indirect application of said oil.

7. The method of claim 1, further comprising applying oil to said chewing gum sheet, wherein said applying of said oil to said chewing gum sheet is achieved via at least one oil roller.

8. The method of claim 7, wherein said oil applied to said chewing gum sheet is 0.1% to 3% of a weight of said chewing gum sheet.

9. The method of claim 1, further comprising removing excess chewing gum from said at least one cutting device via application of compressed air.

10. The method of claim 1, further comprising cooling the chewing gum at least one of before said cutting and after said cutting.

11. The method of claim 1, wherein said applying of said oil to said at least one cutting device is achieved via an oil sprayer.

12. The method of claim 1, wherein said chewing gum sheet is a cut through a complete height of said chewing gum sheet along at least one edge of chewing gum sheet.

13. The method of claim 1, wherein removing excess oil further includes removing excess oil from at least one of said at least one cutting device via said oil scraper.

14. The method of claim 1, wherein removing excess oil further includes removing excess oil from a conveyor supporting said chewing gum sheet via said oil scraper.

15. The method of claim 13, wherein removing excess oil further includes removing excess oil from a conveyor supporting said chewing gum sheet via said oil scraper.

* * * * *